Figures 1, 2:
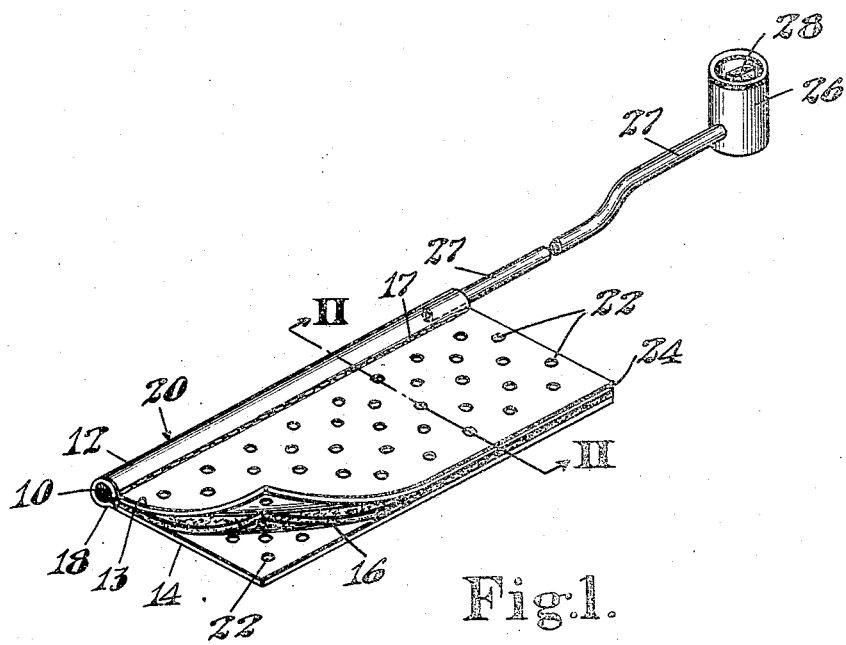

Sept. 29, 1931.   A. L. HOWARD   1,824,997
LUBRICATING WELT AND SYSTEM OF USING THE SAME Filed Dec. 31, 1929

INVENTOR.
Albert L. Howard.

Patented Sept. 29, 1931

1,824,997

UNITED STATES PATENT OFFICE

ALBERT L. HOWARD, OF BROCKTON, MASSACHUSETTS, ASSIGNOR TO HAMILTON-WADE COMPANY, OF BROCKTON, MASSACHUSETTS, A CORPORATION OF MASSACHUSETTS

LUBRICATING WELT AND SYSTEM OF USING THE SAME

Application filed December 31, 1929. Serial No. 417,806.

This invention relates to improvements in lubricating welting or packing, more particularly adapted for use in joints in which direct contact is to be avoided between assembled parts, and a system of using the same.

In the construction of automobile bodies and in other structures built up of assembled parts where the elements of appearance, durability, absorption of vibration and squeaks, and protection from foreign substances in seams is important, it has been customary to employ welting or packing. One example of such use is in the joint between the fenders and body of automobiles. When in this manner, this packing is called "fender welting". It may be used also with advantage between the body and chassis, or elsewhere in joints or in seams between metallic surfaces, thereby preventing wearing and irritating noises which would be occasioned by direct rubbing and contact of the parts. Even with the application of such welting, adjacent surfaces between metallic parts or between a metallic part and a surface of the welting frequently become dried or abrasive material enters therebetween, destroying the effectiveness of the welting.

In accordance with the present invention, it is proposed to provide a welting or packing of such construction that a lubricating material may be employed in connection with it, to prevent undue wearing or abrasion of the parts. The welting in a preferred form may be constructed by surrounding a porous filler with a suitable fluid-resisting, or preferably fluid-tight covering having depending edges extending outwardly from the filler, forming a flap of the proper width to serve as the packing portion of the welting. Absorbent material, such as felt-roving, wicking or the like, which will carry a supply of lubricant, may be formed as a leaf and inserted between the two depending edges of the flap portion of the welting and, if desired, may extend into the bead. This absorbent leaf serves to present lubricant evenly over the surfaces separated, and holes may be located throughout the flap portion to aid in its uniform distribution.

The absorbent leaf, filler or the inner surfaces of the covering may then be saturated with lubricant and the welting adjusted in place between the parts to be separated. Any suitable form of fastening can be used to hold the parts of the welting in place. Stitching may be employed adjacent the bead filler, passing through the covering and the leaf. Additional lubrication may be provided by connecting a lubricant reservoir to the bead, thereby permitting the lubricant in liquid form to be absorbed by the filler and distributed by means of the filler and leaf throughout the extent of the welting. Accordingly, an important and novel feature of my invention consists in a welting having the capacity of conducting a fluid lubricant throughout its length, in combination with a source for supplying such lubricant to the welting.

A welting of the construction above set forth is particularly effective for use as packing between the chassis, body and fenders of automobiles because the absorbent leaf, which may be both lubricant-absorbent and compressible, aids as a padding to permit working of the parts with a minimum of friction, producing a vibration-absorbing effect of the greatest possible efficiency.

The filler for the bead not only produces an enlargement which closes the entrance to the joint, protecting it from dirt, water or other foreign substances, but also adds to the general appearance in producing a finished effect. The filler also acts as a distributing container for the lubricant and to a certain extent acts as a source of supply for replenishing lubricant to the absorbent leaf.

These and other features of the invention will be best understood and appreciated from the following description of a preferred embodiment thereof, selected for purposes of illustration and shown in the accompanying drawings, in which Fig. 1 is a view in perspective of the welting showing the parts thereof separated at one corner more clearly to illuminate the construction; and Fig. 2 is a view in section along the line 2—2 of Fig. 1.

The welting includes in its structure a filler or core 10 consisting of a cord or other fibrous material which is porous or otherwise capable of holding and distributing a supply of suitable lubricant. This is surrounded by a covering 12, having depending edges 13 and 14 extending at one side of the filler. Between these edges, an absorbent leaf 16 of sheet material is placed. This might take the form of a flattened roving or a strip of cellular product. The parts are then secured in place by stitching 17 passing through the covering and leaf 16, permitting the inner edge 18 of the leaf to extend through into the bead 20 formed by the covering 12 which surrounds the filler 10. This single line of stitching is sufficient to hold all of the parts in place. Holes 22, designed to permit the lubricant to ooze through may be located throughout the extent of the side flap 24 formed by the leaf 16 and the depending edges 13 and 14 of the covering 12. These holes are shown as being round but they may be of any suitable shape, slits having been found to be effective for the purpose intended.

After having completed the construction of the welting, the entire flap 24 may be dipped into a suitable lubricant or the covering edges 13 and 14 turned up and the leaf 16 only covered. This lubricant may consist of heavy oil, or where it is applied to the leaf alone, graphite or grease may be used. The filler 10 also might be saturated with lubricant before stitching the parts together. The lubricant may be more effectively distributed if the holes 22 on opposite sides of the flap are not located in register but staggered with respect to each other, as shown in Fig. 2.

As an auxiliary supply for lubricant, a reservoir 26 filled with suitable lubricating fluid may be connected by means of a tube 27 to the bead 20. If some lubricant-absorbing material 28, such as waste, is placed within the reservoir 26, the supply of oil is more effectively retained.

The covering material 12 may be of any fluid-tight composition which is capable of resisting the flow of both the lubricant and water. However, I prefer to use a textile material, such as cloth, upon the outer surface of which there is a coating 30, indicated more clearly in Fig. 2, composed of a cellulose product or equivalent flexible material. For this purpose ordinary imitation leather or composition cloth has been found suitable, the inner cloth surfaces also aiding in the distribution of the lubricant. The welting of my invention is not restricted to a separate cord filler but the inner edge 18 of the absorbent leaf might well be rolled up to sufficient size to produce the necessary filling effect for the bead.

A welting saturated with lubricant and constructed in the manner indicated has been found to produce good results when used between the fenders and bodies of automobiles, both by preventing corrosive and abrasive action of foreign substances and also by eliminating vibration noises. Where packing of considerable width is required, the absorbent leaf inserted between the covering edges becomes more essential for the even distribution of the lubricant. The parts separated by the welting are usually held in place by clamping bolts or rivets and the continuous application of a lubricant to these fastenings also assists in increasing their durability.

Having thus described my invention, what I claim as new and desire to secure by Letters Patent of the United States is:

1. A fender welting of flexible textile material having a longitudinally disposed bead with an absorbent filler extending along one of its edges.

2. A fender welting of flexible textile material having a longitudinally disposed lubricant-carrying bead extending along one of its edges, and a fluid-tight covering surrounding said bead.

3. A fender welting of flexible textile material having an edge bead with an internal porous core constructed and arranged to contain and carry lubricant, a fluid-tight covering surrounding said bead, and a laterally-extending flap communicating with the bead and containing lubricant.

4. A fender welting of flexible textile material having an internally porous edge bead, a laterally-disposed flap attached to the bead and containing a lubricant carrier, and a fluid-tight covering surrounding said bead and flap.

5. A packing welt having an enlarged bead, a side flap portion attached to said bead and containing a lubricant and a fluid-tight covering surrounding said bead and side flap, said covering being perforated through the portion which covers the flap to permit exit of the lubricant throughout the flap portion.

6. A packing welt having an enlarged bead containing an absorbent filler, and a fluid-tight covering for said filler, having depending edges extending from one side of said bead, forming a side flap portion and being perforated throughout said flap portion.

7. A packing welt having an enlarged bead containing an absorbent filler, a fluid-tight covering for said filler, having depending edges extending from one side of said bead forming a side flap portion, perforations in said covering for the flap portion and a compressible absorbent leaf between said depending edges, contacting with said filler.

8. A packing welt having an enlarged bead including a filler impregnated with lubricant, a covering therefor composed of fabric with an outer fluid-tight surface and having depending edges bound together, forming a flap and perforations extending through the covering of the flap.

9. A packing welt having an enlarged bead containing a porous filler, a fluid-tight covering for said filler, having depending edges extending from one side of said bead forming a side flap portion, a compressible absorbent leaf between said depending edges, contacting with said filler, and a line of stitching extending through said covering and leaf adjacent the bead.

10. A packing welt having an enlarged bead including a filler impregnated with lubricant, a covering therefor composed of fabric with an outer fluid-tight surface and having depending edges bound together forming a flap, a compressible absorbent leaf enclosed within said flap and perforations extending through said covering and exposing said leaf.

11. A packing welt having a lubricant-conducting bead, a side flap portion attached to said bead, a fluid-tight covering surrounding said bead, and a lubricant reservoir connected to said bead.

12. A packing welt having an enlarged bead, a fluid-tight covering around said bead having depending edges extending to one side, forming a flap, and a lubricant reservoir connected to said bead.

13. A packing welt having an enlarged bead including a fluid-tight covering therefor having depending edges extending to one side, an absorbent compressible wicking enclosed between said depending edges with one of the edges of said wicking inserted in said bead and a lubricant reservoir connected to said bead.

14. A packing welt having an enlarged bead including a fluid-tight covering therefor, having depending edges extending to one side, an absorbent filler in said bead and an absorbent leaf enclosed between said depending edges, stitching passing through said covering and said leaf adjacent the filler, perforations in said covering along the surface of said leaf and a lubricant reservoir connected to said bead.

ALBERT L. HOWARD.